United States Patent
Matsumoto et al.

(10) Patent No.: US 7,074,281 B2
(45) Date of Patent: Jul. 11, 2006

(54) MAGNETIC POWDER FOR MAGNETIC RECORDING

(75) Inventors: Kazuyuki Matsumoto, Okayama (JP); Kimitaka Sato, Okayama (JP); Takatoshi Fujino, Honjo (JP); Kenichi Inoue, Okayama (JP)

(73) Assignee: Dowa Mining Co., Ltd., Tokyo (JP)

( * ) Notice: Subject to any disclaimer, the term of this patent is extended or adjusted under 35 U.S.C. 154(b) by 101 days.

(21) Appl. No.: 10/378,933

(22) Filed: Mar. 5, 2003

(65) Prior Publication Data

US 2003/0168129 A1    Sep. 11, 2003

(30) Foreign Application Priority Data

Mar. 7, 2002    (JP) .............................. 2002-061422

(51) Int. Cl.
*H01F 1/04*    (2006.01)

(52) U.S. Cl. ...................... 148/311; 428/403; 428/692; 428/694 R; 428/694 MT; 428/900; 252/62.55

(58) Field of Classification Search ........ 148/306–311; 428/403, 694 R, 900, 694 MT, 692; 252/62.55
See application file for complete search history.

(56) References Cited

U.S. PATENT DOCUMENTS 6,309,479 B1 * 10/2001 Okinaka et al. ............ 148/301
6,432,503 B1 *  8/2002 Aonuma et al. ........... 428/65.3

FOREIGN PATENT DOCUMENTS

| JP | 10-69629 A | 3/1998 |
|----|------------|--------|
| JP | 2001-6147 A | 1/2001 |
| JP | 2001-81506 A | 3/2001 |

* cited by examiner

*Primary Examiner*—John P. Sheehan
(74) *Attorney, Agent, or Firm*—Clark & Brody

(57) ABSTRACT

A magnetic powder for magnetic recording is provided that has improved properties suitable for a magnetic recording medium used with a high-sensitivity read head utilizing an MR device. The magnetic powder is composed of iron-base acicular particles containing Co, Al, R (rare earth elements, including Y) and oxygen within the ranges of Co/Fe=10–50 at. %, dissolved Al/(Fe+Co)=5–50 at. %, R/(Fe+Co)=2–25 at. % and oxygen=not greater than 25 wt %; and the acicular particles have an average major axis length of 25–80 nm and a saturated magnetization σs of 10–130 emu/g,

7 Claims, 2 Drawing Sheets

MAGNETIC POWDER FOR MAGNETIC RECORDING

BACKGROUND OF THE INVENTION

1. Field of the Invention

This invention relates to a magnetic powder composed of fine particles and having high magnetic anisotropy that is suitable for high density recording.

2. Background Art

The volume of information that needs to be recorded/stored has increased constantly in recent years owing to the application of digital and high-band technologies to sound/voice and video information. As the volume of stored information increases so does the magnitude of the damage/loss incurred should the information be lost. The importance of data backup in maintaining today's advanced information society can therefore be expected to increase still further in coming years. At the same time, the need for downsizing and boosting the capacity of the devices and media used for recording/storing such information is also continuing to intensify.

Among the different information recording technologies, magnetic recording has invariably maintained a central position owing to such features as nonvolatility, high recording density, read/write speed, and low cost per unit recording volume. Media such as magnetic tape and magnetic disks that are produced by applying a magnetic paint formulated to include magnetic particles to a film are especially superior to other media not only in productivity but especially in the low cost per unit recording volume and excellent removability realized by winding magnetic tape into rolls to achieve virtual three-dimensional recording. As these media are therefore anticipated to continue to play a critical role in data backup, strong market demand exists for products with improved recording density, reliability, durability and economy.

The recording capacity of magnetic recording media, e.g., hard disks, has been increasing at the rate of 60–100% annually in recent years. This advance is driven in part by utilization of MR (magneto-resistive) devices such as magnetic heads. The same MR device technology has also been applied to upgrade the recording density of magnetic tapes. The magnetic head employing an MR device is referred to as an "MR head."

To obtain high reproduction output with a conventional magnetic induction head it is necessary to establish a large value of [residual magnetic flux density× magnetic layer thickness (hereinafter called Mr·t)]. In contrast, the output of the device used in an MR head, which has high sensitivity, saturates at an unnecessarily high Mr, so that increasing Mr·t has the reverse effect of decreasing sensitivity. It is also known regarding magnetic recording that noise decreases with decreasing Mr·t/Hc and increasing number of magnetic particles per unit volume of the medium. While the AMR head is currently the most widely used MR head, other heads with even higher sensitivity than the MR head, most notably the GMR head and the TMR head, are also under development. This further increase the need to reduce medium noise.

In the light of the foregoing, a magnetic powder capable of achieving high output and C/N ratio in the short wavelength region must meet the following criteria:

(1) At any given thickness of the magnetic layer, the coercive force Hc should be high and the saturated magnetization σs should be within an appropriate range at which the output does not saturate. In other words, it is important that σs be controllable without degrading other magnetic properties.

(2) The number of magnetic particles per unit volume should be great. The particles must be made fine to achieve a large number of particles per unit volume.

In view of these considerations, the techniques set out below, for instance, have been proposed for achieving high output and C/N in the short wavelength region.

JP 2001-6147A for example, teaches a ferromagnetic metal powder suitable for use in a high-density digital recording system whose properties include: major axis length of 30–120 nm, axial ratio of 3–8, Hc of 1,000–4,000 Oe, and σs of 100–180 emu/g.

JP 10-69629A filed by the present assignee teaches a magnetic powder for achieving superior magnetic properties of a high quality that is composed of Fe containing 5–50 at. % of Co, 0.1–30 at. % of Al, 0.1–10 at. % of rare earth elements (including Y), not more than 0.05 wt % of Periodic Table group 1a elements and not more than 0.1 wt % of Periodic Table group 2a elements and has Hc of 1,200–3,000 Oe and σs of 100–200 emu/g.

JP 2001-81506A filed by the present assignee teaches a precursor for producing a magnetic powder that is composed of acicular particles obtained by incorporating Co, Al, Si and R (where R represents at least one rare earth element, including Y) in iron oxy-hydroxide and that is used to coat the surface layer portion of particles containing Co at more than 0 to 50 at. % relative to Fe and further containing 0.1–30 at. % of dissolved Al with a layer containing 0.1–10 at. % of Si and 0.1–15 at. % of R. However, the powders taught by these publications are intended for a system requiring high output and are not intended for use in a system that utilizes one of the aforementioned types of MR heads (AMR head, GMR head or TMR head).

As regards σs, on the other hand, in contrast to iron, which has a σs of 214, magnetite and mag-hematite, two magnetic substances among the iron system oxides, have σs of 90 emu/g and 80 emu/g, respectively, and from the fact that hematite is a permanent magnet, metal magnetic particles produced from iron oxy-hydroxide or iron oxide as a precursor and finally obtained by reduction processing will obviously experience a decline in σs if the metal particle surface is oxidized. From this it follows that σs can be lowered by raising the temperature and/or oxygen concentration in the final slow oxidation treatment of the metal particles so as to increase the degree of particle oxidation and thereby decrease the σs of the particles as a whole. When this method is used to realize low σs, however, the advanced degree of oxidation results in an oxygen content exceeding 25 wt % in the case of particles with a major axis length of 20–80 nm. Moreover, by this method of oxidizing the particle surfaces, the axial ratio of the metal core decreases with increasing oxidation so that the magnetic shape anisotropy decreases. This lowers Hc, degrades SFD and otherwise markedly degrades the magnetic properties. Excessive slow oxidation treatment of the particles is therefore not preferable in producing magnetic powder with high Hc. Owing these circumstances, magnetic particles having a major axis length of 20–80 nm that exhibit high Hc have not been obtainable when utilizing increased oxygen content of greater than 25% to lower σs.

Particle σs can also be lowered by decreasing the reducing temperature to obtain the metallic iron so as to reduce the particle reduction rate. However, this suppresses growth of crystal grains inside the particles and therefore increases the grain boundary ratio, causes meso-pores, micro-pores and the like to remain, and produces magnetic poles by increasing the irregularity of the particle surfaces. The result is marked degradation of magnetic properties. Excessive reduction of the particle reduction rate is therefore undesirable in producing magnetic powder with high Hc. Owing to the different points explained in the foregoing, there is a need for development of a technology capable of lowering σs without lowering Hc.

Despite earlier research efforts such as those discussed above, no iron-base magnetic powder suitable for the high-sensitivity read MR heads (AMR, GMR and TMR heads) indispensable for tomorrow's high recording density systems can be said to have become available up to now.

The need felt for economical, industrial-scale production of magnetic powders meeting the aforesaid requirements remains far from met. In the field of iron-base magnetic powders that utilize acicular (including needle-like, spindle-like and flat-needle-like) iron oxy-hydroxide and iron oxide as starting material, for example, there has not yet been realized a magnetic powder suitable for high recording density systems using high-sensitivity read MR heads, namely, a magnetic powder that simultaneously satisfies the properties of a major axis length of not greater than 80 nm and σs of not greater than 90 emu/g while still achieving an Hc of 2,200 Oe or greater. The object of the present invention is to provide a magnetic powder of this description.

SUMMARY OF THE INVENTION

In order to achieve this object, the inventors used acicular iron oxy-hydroxide and iron oxide as starting material in numerous tests conducted with regard to the kind and addition conditions of elements to be dissolved in the starting material and of elements to be adhered to the particle surface layers. The inventors also conducted numerous tests with regard to the heat-reduction and slow oxidation treatments for these precursors. Through such research aimed at determining whether a magnetic powder suitable for high recording density systems using MR heads could be obtained, the inventors learned that when Co/Fe=10–50 at. %, if Al/(Co+Fe) is 5–50 at. % and a condition is established that enables Al to dissolve readily in the iron oxy-hydroxide or iron oxide, and, further, if among the members of R (rare earth elements, including Y) one suitable for the condition is selected, then, provided that appropriate drying is carried out, it is possible, as indicated in the working examples explained later, to obtain a magnetic powder that satisfies the properties of a major axis length of not greater than 80 nm and a σs of not greater than 90 emu/g while also holding oxygen content to a low value not greater than 25 wt % to thereby achieve an Hc of not less than 2,200 Oe.

Specifically, the present invention provides a magnetic powder for magnetic recording, particularly adapted to the needs of an MR device magnetic head (AMR, GMR or TMR head), composed of iron-base acicular particles containing Co, Al, R (rare earth elements, including Y) and oxygen within the following ranges:

Co/Fe=10–50 at. %, preferably 20–45 at. %,

Al present inside the particles (hereinafter called "dissolved Al")/(Fe+Co)/=5–50 at. %, preferably 8–50 at. %, more preferably 9–45 at. %, on occasion 9–40 at. %, R/(Fe+Co)=2–25 at. %, preferably 6–25 at. %, more preferably 10–20 at. %, and oxygen=not greater than 25 wt %, preferably not greater than 22 wt %, more preferably not greater than 17 wt %;

and wherein the acicular particles have an average major axis length of 25–80 nm, preferably 25–65 nm, more preferably 25–45 nm, a saturated magnetization σs of 10–130 emu/g, preferably 10–110 emu/g, more preferably 10-less than 90 emu/g, and a coercive force Hc of 1,400–2,800 Oe, preferably 1,900–2,800 Oe, more preferably 2,100–2,800 Oe, on occasion 2,200–2,800 Oe.

Such a magnetic powder can be produced by the method of preparing acicular particles composed of iron oxy-hydroxide containing Co, based on total Fe, of Co/Fe=10–50 at. %, containing dissolved Al of Al/(Fe+Co)=5–50 at. %, and coated with a layer containing R of R/(Fe+Co)=2–25 at. %, appropriately heating the particles in an oxidizing atmosphere or a reducing atmosphere to obtain an iron system oxide, reducing the iron system oxide in an appropriate reducing gas, and slowly oxidizing the result at a temperature of 20–300° C. in an oxidizing gas.

DESCRIPTION OF THE PREFERRED EMBODIMENTS

Figure 1:
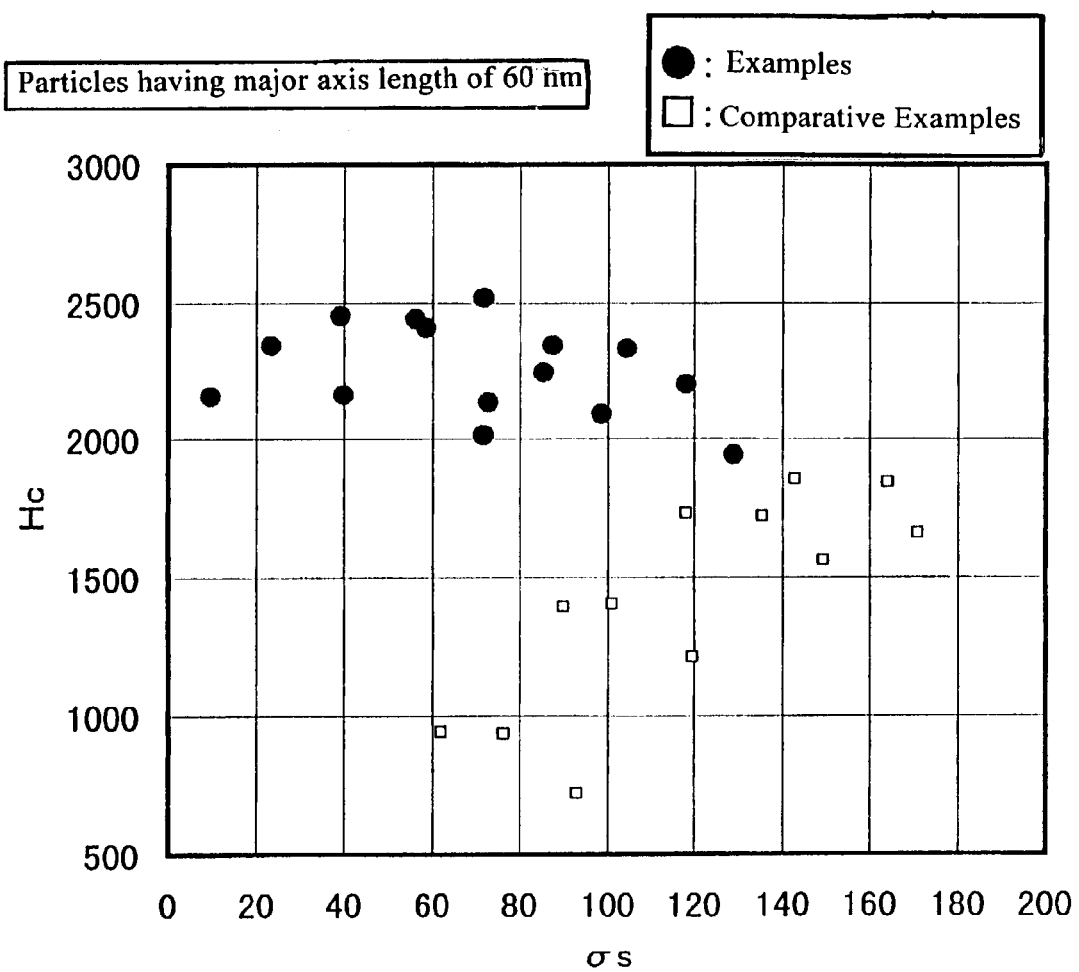
FIG. 1 is a graph showing the relationship between Hc and σs in the case of magnetic powders according to the invention and the same relationship in the case of comparative magnetic powders.

Production of metallic magnetic powder using acicular iron oxy-hydroxide or iron oxide as a precursor is generally done by heat-reducing the precursor. Since the product of the reduction is combustible as produced, however, an oxide coating is formed on the particle surfaces by oxidizing treatment. In order to accomplish the object of this invention mentioned earlier, the inventors conducted experiments in which the acicular iron oxy-hydroxide or iron oxide was changed variously in its form as a starting material.

The following description will begin with an explanation of a typical method of producing a precursor for obtaining the magnetic powder according to the present invention.

In order to obtain a magnetic powder that achieves the object of the invention, there is first produced a precursor consisting of acicular particles composed of iron oxy-hydroxide containing Co of, based on total Fe, Co/Fe=10–50 at. %, containing dissolved Al of Al/(Fe+Co)=5–50 at. %, and coated with a layer containing R of R/(Fe+Co)=2–25 at. %. Iron oxy-hydroxide that is shuttle-like or flat-needle-like rather than acicular can also be used.

The reason for defining the Co content in terms of Co/Fe atomic ratio (percentage) as 10–50 at. % is as explained in the following. It is worth noting that if no Fe and Co enter/leave thereafter (as is actually the case), the Co/Fe ratio of the precursor corresponds to the Co/Fe ratio of the final magnetic powder. The reason explained here is therefore also responsible for defining the Co content of the magnetic powder. The same also applies to Al and R hereinafter.

Hc, an important parameter of the magnetic powder, is related to the saturated magnetization per unit volume and the axial ratio (major axis length/minor axis length) of the magnetic powder substance. Since the saturated magnetization per unit volume is determined by the Fe—Co alloy composition, it is, from this aspect, necessary to set Co/Fe as 10–50 at. %, preferably 20–45 at. %. Alloying within this composition range also contributes to achieving desired improvement of oxidation resistance, Magnetic powder containing Co can be prepared by neutralizing an aqueous solution of ferrous salt with an alkali carbonate, i.e., carrying out the goethite production reaction, to cause carbonatization (depending on the desired properties, this carbonatization can conducted using a mixture of an alkali carbonate and a caustic alkali), and oxidizing the result with air or the like. When $\alpha$-FeOOH is to be grown, a water-soluble Co salt is added to the aqueous solution of ferrous salt beforehand. Otherwise, a water-soluble Co salt can be added in the course of $\alpha$-FeOOH growth or a water-soluble Co salt can be added after the growth to adhere it to the surface of the $\alpha$-FeOOH.

Al content is defined such that the amount of Al dissolved in the goethite is 5–50 at. % as Al/(Fe+Co). This is because this amount of Al is needed to prevent sintering and ensure shape retention during heat treatment such as heating/reduction, and further because a high Al content operates synergistically with a rare earth element (including Y) explained later to enhance the sintering prevention effect of the coating, and because $\sigma s$ can be regulated to a low value by regulating the amount of dissolved Al.

Although $\sigma s$ decreases with increasing amount of dissolved Al, the decrease in $\sigma s$ exceeds that of a simple proportional decline in $\sigma s$ with increasing amount of Al. This is thought to be mainly because the presence of dissolved Al changes the crystal structure of the interior metal portion by, for example, deforming its lattice, thereby reducing magnetization.

Al can be dissolved in goethite by dripping in an aqueous solution of a water-soluble salt of Al or an aluminate before or during goethite growth. Addition of an excessive amount of Al from the start inhibits goethite oxidation growth and results in formation of goethite with degraded acicularity. Al is therefore preferably added during goethite growth.

R content is defined to fall in the range of 2–25 at. % as R/(Fe+Co). The sinter preventing action of R is best obtained by coating the precursor particles with an amount of R, i.e., a rare earth element (including Y), such that R/(Fe+Co)=2–25 at. %. Preferable rare earth elements include Y, Gd and Yb. It was found that magnetic properties in the low $\sigma s$ region were more improved when the heavier rare earth element was selected. In the case of a magnetic powder having a metal major axis length of 60 nm, for example, it was found that while good magnetic properties could be obtained using Y or the like in the region of a $\sigma s$ of 100 emu/g and higher, better magnetic properties were obtained using Gd, Yb or the like in the region below 100 emu/g. A rare earth element can be incorporated in the precursor by dripping an aqueous solution containing the rare earth element into the reaction slurry during goethite growth or by adding an aqueous solution containing the rare earth element to the slurry after goethite growth.

In this manner there can be obtained a precursor consisting of acicular particles composed of iron oxy-hydroxide containing the foregoing amount of Co and coated with R. An iron oxide can be obtained by using a conventional technique to dewater the particles by heating in the range of 250–600° C. in an oxidizing atmosphere or a reducing atmosphere. An appropriate amount of steam can be added to the atmosphere during the heating and dewatering.

The iron oxide is then reduced using carbon monoxide, acetylene hydrogen or other reducing gas heated to a temperature in the range of 250–600° C. Multistage reduction can be conducted at this time. By multistage reduction is meant reduction in which each stage consists of holing the iron oxide at a certain temperature within the set temperature range for a prescribed time period and a number of successive stages are conducted at different holding temperatures. The properties of the magnetic powder can be varied by appropriately controlling the holding temperature and the time period. The atmosphere used for his reduction treatment is preferably one obtained by adding steam to the reducing gas.

Since the alloy magnetic particle powder obtained by this reduction under heating is liable to ignite if handled in the atmosphere without further treatment, it is subjected to an ensuing slow oxidation treatment for forming on the particle surfaces an oxide layer composed of one or both of a nonmagnetic oxide layer and a magnetic oxide layer of not greater than 90 emu/g. The slow oxidation treatment forms the oxide layer on the particle surfaces by holding the particles for a prescribed period of time in an inert gas containing an oxidizing gas and heated to a temperature of 20–300° C. while gradually increasing the amount of the oxidizing gas. In actual practice, this is preferably done by cooling the reduced powder to the temperature for conducting the slow oxidation treatment and conducting the slow oxidation at this temperature. Specifically, as in the examples set out later, it is preferable to carry out a stabilization process in which the reduced particle surfaces are formed with an oxide layer by cooling them from the final reducing temperature to a temperature in the range of 50–200° C. and then oxidizing them in a weak oxidizing gas at this temperature. Although the saturated magnetization $\sigma s$ decreases in proportion as the temperature cooled after completion of the reduction is higher, the other magnetic properties are, as pointed out earlier, degraded when this temperature is too high.

In this manner there can be obtained a magnetic powder for magnetic recording composed of iron-base acicular particles containing Co, Al, R in amounts of Co/Fe=10–50 at. %, preferably 20–45 at. %; Al/(Fe+Co)=5–50 at. %, preferably 8–50 at. %, more preferably 9–45 at. %, on occasion 9–40 at. %; and R/(Fe+Co)=2–25 at. %, preferably 6–25 at. %, more preferably 10–20 at. %; having an oxygen content of not greater than 25 wt %, preferably not greater than 22 wt %, more preferably not greater than 17 wt %; and wherein the acicular particles possess the characteristics of an average major axis length of 25–80 nm, preferably 25–65 nm, more preferably 25–45 nm; a saturated magnetization $\sigma s$ of 10–130 emu/g, preferably 10–110 emu/g, more preferably 10-less than 90 emu/g; and a coercive force Hc of 1,400–2,800 Oe, preferably 1,900–2,800 Oe, more preferably 2,100–2,800 Oe, on occasion 2,200–2,800 Oe. This magnetic powder offers performance that fully meets the requirements of a magnetic powder for magnetic recording, particularly for an MR device magnetic head.

The inventors believe that reason for it being possible to obtain such a magnetic powder composed of metal particles whose oxygen content can be held low even at a low saturated magnetization $\sigma s$ and that therefore exhibits a high coercive force Hc is that the use of more than conventional amounts of dissolved Al and rare earth element(s) as sinter preventing agents produces a synergistic improvement in shape retention effect that exceeds that by increasing only Al or only the rare earth element and works to enhance the magnetic shape anisotropy of the particles.

In the examples set out below, the particle dimensions, for example the average major axis length (unit: nm) shown in the table are all values obtained by averaging numerical values measured from transmission electron micrographs. The Co, Al and rare earth element contents of the magnetic particle powders shown in the table are values measured by ICP. The magnetic property values were measured by VSM. Dx (crystal grain diameter, expressed in angstroms) was determined from the Debye-Scherrer equation using the X-ray diffraction method. Weather resistance ($\Delta\sigma s$) was evaluated as percent (%) decrease in $\sigma s$ between the original value and the value measured after one-week storage in a 60° C., 90% RH environment.

Coating properties (tape properties) were determined with respect to a magnetic tape fabricated by blending with 100 parts by weight of the magnetic powder each of the materials set out below in the indicated number of parts by weight, homogenizing the mixture in a centrifugal ball mill for 1 hour to obtain a magnetic paint and applying the magnetic paint on a base film composed of polyethylene terephthalate to fabricate a magnetic tape. The coercive force Hcx of the magnetic tape was measured and the SFD value was calculated from the hysteresis loop.

| | |
|---|---|
| Magnetic powder | 100 parts by weight |
| Polyurethane resin | 30 parts by weight |
| Methyl ethyl ketone | 190 parts by weight |
| Cyclohexanone | 80 parts by weight |
| Toluene | 110 parts by weight |
| Stearic acid | 1 part by weight |
| Acetylacetone | 1 part by weight |
| Alumina | 3 parts by weight |
| Carbon black | 2 parts by weight |

EXAMPLES

Example 1

Sixty-three grams of goethite containing dissolved Co of Co/(Fe+Co)=24 at. % and dissolved Al of Al/(Fe+Co)=5 at. % was placed in 2,500 ml of pure water, to which was added 240 g of 20 wt % $NH_3$ aqueous solution. Homogenation was promoted by stirring. To the homogenized slurry was added 165.0 g of an aqueous solution of gadolinium having a Gd concentration of 2.0 wt %. The reaction was terminated after stirring for 30 min.

The iron oxy-hydroxide system substance containing Co, Al and Gd obtained by this reaction was filtered with a Buchner funnel, washed with ion exchange water, and dried at 110° C. in the air. The iron oxy-hydroxide system powder obtained was fired at 370° C. and then reduced in a hydrogen reducing atmosphere at an average temperature of 490° C. After reduction, the powder was cooled to 120° C., whereafter $N_2$ gas containing 0.1% oxygen was introduced to conduct surface oxidation treatment. The magnetic powder obtained had an average major axis length of 57 nm. The composition, bulk properties and tape properties of the magnetic powder are shown in Table 1.

Examples 2–5

Example 1 was repeated except that goethites having the Al contents shown below were used. The compositions, bulk properties and tape properties of the magnetic powders obtained are shown in Table 1.

Al content of goethite
Example 2: Al/(Fe+Co)=10 at. %
Example 3: Al/(Fe+Co)=20 at. %
Example 4: Al/(Fe+Co)=30 at. %
Example 5: Al/(Fe+Co)=45 at. %

Examples 6–10

Example 1 was repeated except that goethites having the Al contents shown below were used and the amount of the aqueous solution of gadolinium (Gd concentration=2 wt %) added was invariably changed to 825.0 g. The compositions, bulk properties and tape properties of the magnetic powders obtained are shown in Table 1.

Al content of goethite
Example 6: Al/(Fe+Co)=5 at. %
Example 7: Al/(Fe+Co)=10 at. %
Example 8: Al/(Fe+Co)=20 at. %
Example 9: Al/(Fe+Co)=30 at. %
Example 10: Al/(Fe+Co)=45 at. %

Amount of added gadolinium aqueous solution (g)
Example 6: 825.0 g
Example 7: 825.0 g
Example 8: 825.0 g
Example 9: 825.0 g
Example 10: 825.0 g Examples 11–15

Example 1 was repeated except that goethites having the Al contents shown below were used and the amount of the aqueous solution of gadolinium (Gd concentration=2 wt %) added was invariably changed to 1,375.0 g. The compositions, bulk properties and tape properties of the magnetic powders obtained are shown in Table 1.

Al content of goethite
Example 11: Al/(Fe+Co)=5 at. %
Example 12: Al/(Fe+Co)=10 at. %
Example 13: Al/(Fe+Co)=20 at. %
Example 14: Al/(Fe+Co)=30 at. %
Example 15: Al/(Fe+Co)=45 at. %

Amount of added gadolinium aqueous solution (g)
Example 11: 1,375.0 g
Example 12: 1,375.0 g
Example 13: 1,375.0 g
Example 14: 1,375.0 g
Example 15: 1,375.0 g Comparative Examples 1–12

In Comparative Examples 1–12, one or both of the Al content and the Gd content were made lower than those defined by the present invention and $\sigma s$ was lowered by intensifying the surface oxidation after reduction. Within each of the three groups consisting of Comparative Examples 1–4, Comparative Examples 5–8 and Comparative Examples 9–12, the Al and Gd amounts were kept the same but the temperature during surface oxidation following completion of reduction was varied.

Thus Comparative Examples 1–12 were conducted by repeating Example 1 except that the Al content of the goethite was changed as shown below, the amount of the aqueous solution of gadolinium (Gd concentration=2 wt %) added was changed as shown below, and the temperature during oxidation following completion of reduction was varied as shown below. The compositions, bulk properties and tape properties of the magnetic powders obtained are shown in Table 1.

Al content of goethite
Comparative Example 1: Al/(Fe+Co)=3 at. %
Comparative Example 2: Al/(Fe+Co)=3 at. %
Comparative Example 3: Al/(Fe+Co)=3 at. %
Comparative Example 4: Al/(Fe+Co)=3 at. %
Comparative Example 5: Al/(Fe+Co)=10 at. %
Comparative Example 6: Al/(Fe+Co)=10 at. %
Comparative Example 7: Al/(Fe+Co)=10 at. %
Comparative Example 8: Al/(Fe+Co)=10 at. %
Comparative Example 9: Al/(Fe+Co)=3 at. %
Comparative Example 10: Al/(Fe+Co)=3 at. %
Comparative Example 11: Al/(Fe+Co)=3 at. %
Comparative Example 12: Al/(Fe+Co)=3 at. %

Amount of added gadolinium aqueous solution (g)
Comparative Example 1: 55.0 g
Comparative Example 2: 55.0 g
Comparative Example 3: 55.0 g
Comparative Example 4: 55.0 g
Comparative Example 5: 55.0 g
Comparative Example 6: 55.0 g
Comparative Example 7: 55.0 g
Comparative Example 8: 55.0 g
Comparative Example 9: 825.0 g
Comparative Example 10: 825.0 g
Comparative Example 11: 825.0 g
Comparative Example 12: 825.0 g Surface oxidation temperature (° C.) following reduction
Comparative Example 1: 80
Comparative Example 2: 120
Comparative Example 3: 160
Comparative Example 4: 200
Comparative Example 5: 80
Comparative Example 6: 120
Comparative Example 7: 160
Comparative Example 8: 200
Comparative Example 9: 80
Comparative Example 10: 120
Comparative Example 11: 160
Comparative Example 12: 200

Examples 16–20

Comparative Examples 16–20 exemplify the change in properties when the type of rare earth metal is changed. Comparative Examples 16–20 were conducted by repeating Example 7 except that Y, La, Ce, Nd and Yb were used in place of Gd. The amounts of the aqueous solutions of the rare earth elements (R concentration=2 wt %) added were as shown below, which are amounts adjusted so that R/(Fe+Co) of the products obtained by the addition were constant at about 14.7 at. %. The compositions, bulk properties and tape properties of the magnetic powders obtained are shown in Table 1.

Amount of rare earth element aqueous solution added (g)
Example 16 (Y addition): 466.8
Example 17 (La addition): 729.0
Example 18 (Ce addition): 735.0
Example 19 (Nd addition): 757.0
Example 20 (Yb addition): 908.0

TABLE 1

| | Al content of iron oxyhydroxide Al/(Fe + Co) at. % | Type of rare earth element | Amount of added rare earth element aqueous solution (g) | Surface oxidation temp following reduction (° C.) | Magnetic powder composition | | | | |
|---|---|---|---|---|---|---|---|---|---|
| | | | | | Co/Fe at. % | Al/(Fe + Co) at. % | R | R/(Fe + Co) at. % | Oxygen wt. % |
| Exmp 1 | 5 | Gd | 165.0 | 120 | 24 | 5 | Gd | 3 | 16 |
| Exmp 2 | 10 | Gd | 165.0 | 120 | 24 | 10 | Gd | 3 | 17 |
| Exmp 3 | 20 | Gd | 165.0 | 120 | 24 | 20 | Gd | 3 | 18 |
| Exmp 4. | 30 | Gd | 165.0 | 120 | 24 | 30 | Gd | 3 | 18 |
| Exmp 5 | 45 | Gd | 165.0 | 120 | 24 | 45 | Gd | 3 | 19 |
| Exmp 6 | 5 | Gd | 825.0 | 120 | 24 | 5 | Gd | 15 | 16 |
| Exmp 7 | 10 | Gd | 825.0 | 120 | 24 | 10 | Gd | 15 | 17 |
| Exmp 8. | 20 | Gd | 825.0 | 120 | 24 | 20 | Gd | 15 | 18 |
| Exmp 9 | 30 | Gd | 825.0 | 120 | 24 | 30 | Gd | 15 | 20 |
| Exmp. 10 | 45 | Gd | 825.0 | 120 | 24 | 45 | Gd | 15 | 20 |
| Exmp. 11 | 5 | Gd | 1375.0 | 120 | 24 | 5 | Gd | 25 | 16 |
| Exmp. 12 | 10 | Gd | 1375.0 | 120 | 24 | 10 | Gd | 25 | 17 |
| Exmp. 13 | 20 | Gd | 1375.0 | 120 | 24 | 20 | Gd | 25 | 18 |
| Exmp. 14 | 30 | Gd | 1375.0 | 120 | 24 | 30 | Gd | 25 | 20 |
| Exmp. 15 | 45 | Gd | 1375.0 | 120 | 24 | 45 | Gd | 25 | 20 |
| Comp 1 | 3 | Gd | 55.0 | 80 | 24 | 3 | Gd | 1 | 15 |
| Comp 2 | 3 | Gd | 55.0 | 120 | 24 | 3 | Gd | 1 | 20 |
| Comp 3 | 3 | Gd | 55.0 | 160 | 24 | 3 | Gd | 1 | 26 |
| Comp 4 | 3 | Gd | 55.0 | 200 | 24 | 3 | Gd | 1 | 32 |
| Comp 5 | 10 | Gd | 55.0 | 80 | 24 | 10 | Gd | 1 | 14 |
| Comp 6 | 10 | Gd | 55.0 | 120 | 24 | 10 | Gd | 1 | 20 |
| Comp 7 | 10 | Gd | 55.0 | 160 | 24 | 10 | Gd | 1 | 26 |
| Comp 8 | 10 | Gd | 55.0 | 200 | 24 | 10 | Gd | 1 | 32 |
| Comp 9 | 3 | Gd | 825.0 | 80 | 24 | 3 | Gd | 15 | 14 |
| Comp 10 | 3 | Gd | 825.0 | 120 | 24 | 3 | Gd | 15 | 19 |
| Comp 11 | 3 | Gd | 825.0 | 160 | 24 | 3 | Gd | 15 | 26 |
| Comp 12 | 3 | Gd | 825.0 | 200 | 24 | 3 | Gd | 15 | 31 |
| Exmp 16 | 10 | Y | 466.8 | 120 | 24 | 10 | Y | 15 | 17 |

TABLE 1-continued

| | | | | | | | | | |
|---|---|---|---|---|---|---|---|---|---|
| Exmp 17 | 10 | La | 729.0 | 120 | 24 | 10 | La | 15 | 17 |
| Exmp 18 | 10 | Ce | 735.0 | 120 | 24 | 10 | Ce | 15 | 17 |
| Exmp 19 | 10 | Nd | 757.0 | 120 | 24 | 10 | Nd | 15 | 18 |
| Exmp 20 | 10 | Yb | 908.0 | 120 | 24 | 10 | Yb | 15 | 16 |

| | Metal properties | | | | | | Tape properties | |
|---|---|---|---|---|---|---|---|---|
| | Major axis length nm | $\sigma s$ emu/g | $\Delta \sigma s$ % | BET $m^2/g$ | Dx Å | Hc Oe | Hcx Oe | SFD |
| Exmp 1 | 57 | 129 | 10 | 56 | 145 | 1940 | 2070 | 0.73 |
| Exmp 2 | 61 | 118 | 8 | 59 | 127 | 2196 | 2310 | 0.54 |
| Exmp 3 | 62 | 105 | 8 | 63 | 121 | 2331 | 2440 | 0.48 |
| Exmp. 4 | 64 | 86 | 7 | 69 | 116 | 2240 | 2360 | 0.49 |
| Exmp 5 | 67 | 72 | 6 | 73 | 110 | 2012 | 2120 | 0.65 |
| Exmp 6 | 60 | 99 | 10 | 58 | 135 | 2090 | 2211 | 0.65 |
| Exmp 7 | 63 | 88 | 9 | 61 | 117 | 2339 | 2460 | 0.49 |
| Exmp. 8 | 64 | 72 | 8 | 64 | 112 | 2515 | 2640 | 0.38 |
| Exmp 9 | 65 | 56 | 7 | 70 | 108 | 2440 | 2570 | 0.36 |
| Exmp. 10 | 68 | 40 | 5 | 74 | 106 | 2160 | 2290 | 0.61 |
| Exmp. 11 | 63 | 73 | 9 | 59 | 132 | 2133 | 2240 | 0.62 |
| Exmp. 12 | 65 | 59 | 8 | 63 | 115 | 2409 | 2563 | 0.47 |
| Exmp. 13 | 66 | 39 | 7 | 65 | 111 | 2451 | 2580 | 0.36 |
| Exmp. 14 | 68 | 24 | 6 | 71 | 107 | 2338 | 2460 | 0.39 |
| Exmp. 15 | 71 | 11 | 6 | 76 | 106 | 2154 | 2280 | 0.60 |
| Comp 1 | 49 | 171 | 24 | 43 | 169 | 1662 | 1780 | 0.70 |
| Comp 2 | 50 | 150 | 9 | 43 | 164 | 1561 | 1680 | 0.83 |
| Comp 3 | 50 | 120 | 4 | 43 | 161 | 1210 | 1360 | 1.07 |
| Comp 4 | 50 | 93 | 0 | 43 | 159 | 721 | 850 | 1.47 |
| Comp 5 | 59 | 164 | 25 | 53 | 169 | 1838 | 1954 | 0.59 |
| Comp 6 | 59 | 136 | 10 | 53 | 164 | 1721 | 1830 | 0.76 |
| Comp 7 | 59 | 101 | 3 | 53 | 161 | 1400 | 1463 | 1.08 |
| Comp 8 | 59 | 77 | 0 | 53 | 159 | 934 | 1009 | 1.41 |
| Comp 9 | 53 | 143 | 24 | 47 | 171 | 1850 | 1978 | 0.56 |
| Comp 10 | 53 | 118 | 8 | 47 | 166 | 1730 | 1860 | 0.75 |
| Comp 11 | 53 | 90 | 3 | 47 | 162 | 1390 | 1510 | 1.00 |
| Comp 12 | 53 | 62 | 0 | 47 | 160 | 940 | 1080 | 1.38 |
| Exmp 16 | 60 | 102 | 8 | 67 | 125 | 2360 | 2480 | 0.48 |
| Exmp 17 | 60 | 97 | 6 | 58 | 132 | 2195 | 2320 | 0.50 |
| Exmp 18 | 61 | 95 | 6 | 65 | 124 | 1920 | 2120 | 0.70 |
| Exmp 19 | 58 | 94 | 7 | 56 | 123 | 2190 | 2310 | 0.50 |
| Exmp 20 | 60 | 78 | 8 | 57 | 124 | 2353 | 2510 | 0.49 |

The following conclusions can be drawn from Table 1:

(1) Comparing Examples 1–15 and Comparative Examples 1–8

In Examples 1–15, low σs was achieved by increasing the amounts of Al and Gd. Moreover, Hc stayed at a high level not withstanding the lowering of σs in these Examples. The lowering of σs was achieved by increasing the Al and Gd contents, i.e., by a method that did not rely on intensifying surface oxidation, so that the high Hc could be realized without degrading core acicularity and is traceable to the fact that the increased amount of Al and Gd enabled these elements to operate more strongly as sinter preventing agents. The synergistic effect produced by the increased amounts of both Al and Gd resulted in a markedly higher Hc. Thus in Examples 1–15, low σs and high Hc were simultaneously achieved.

To the contrary, in Comparative Examples 1–8, in which the content of one or both of Al and Gd was low, σs lowering could be promoted by increasing the temperature during surface oxidation so as to intensify oxidation, but this led to a marked decline in Hc owing to pronounced degradation of the acicularity of the metal core at the particle interior. Thus in Comparative Examples 1–8, it was impossible to achieve low σs and high Hc simultaneously.

The Hc and σs of the magnetic powders obtained in Examples 1–15 and Comparative Examples 1–12 are plotted in the graph of FIG. 1. From this graph, also, it can be clearly seen that Hc declined with lowering of σs in the Comparative Example magnetic powders, while, in contrast, high Hc was achieved despite lowering of σs in the Example powders according the present invention.

Figure 2:
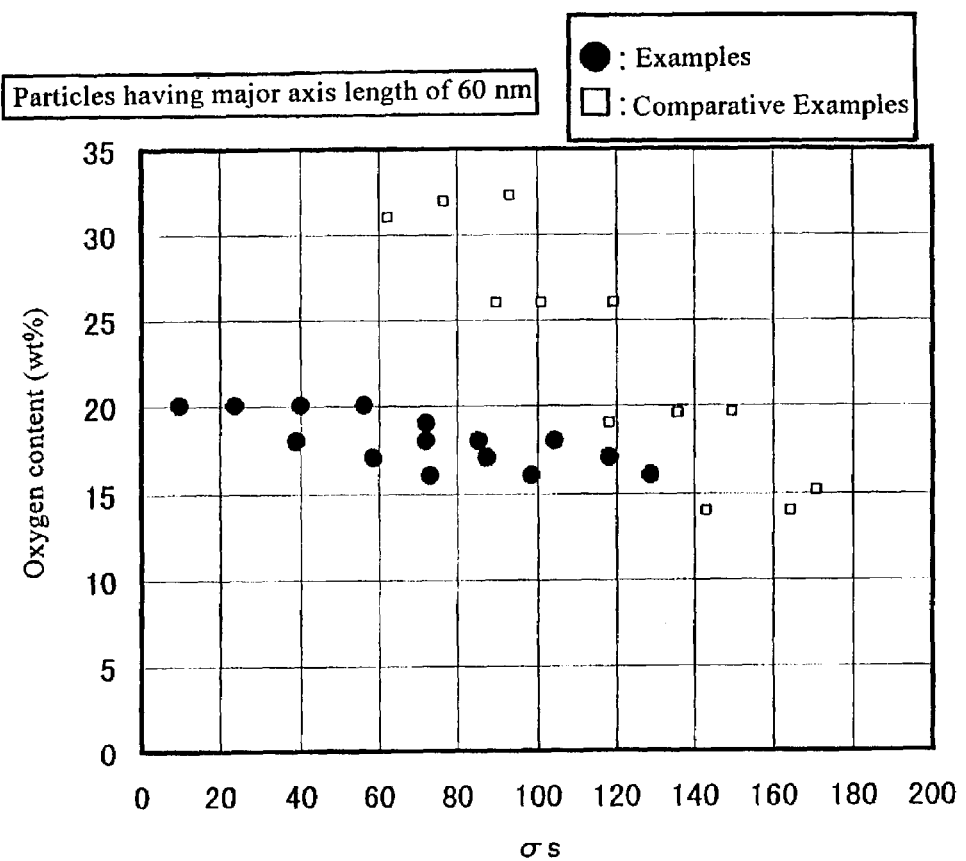
FIG. 2 is a graph showing the relationship between oxygen content and σs in the case of a magnetic powders according the invention and the same relationship in the case of a comparative magnetic powders.

The oxygen content and σs of the magnetic powders obtained in Examples 1–15 and Comparative Examples 1–12 are plotted in the graph of FIG. 2. It can be seen that in the Comparative Examples oxygen content increased with decreasing σs, while in the magnetic powders according to Examples of the present invention, the lowering of σs achieved was not attributable to increased oxygen content.

(2) Comparing Example 7 with Examples 16–20

Here it can be seen that an effect of lowering σs is also achieved even when the kind of rare earth element is changed. As the rare earth element content (at. %) is constant in these Examples, the amount by which σs decreases can be seen to be a function of the atomic weight of the rare earth metal. Specifically, the σs lowering effect increases with increasing atomic weight of the rare earth metal. Hc is affected by the kind of rare earth metal. This is because the sinter preventing effect varies depending on the kind of rare earth metal. The metals with large sinter preventing effect are Y, Gd and Yb.

As explained in the foregoing, the present invention provides an iron-base magnetic powder suitable for high-sensitivity read MR heads (AMR, GMR and TMT heads). It can, for instance, provide a low saturated magnetism and high coercive force magnetic powder that, while having a major axis length of not greater than 80 nm and a σs of less than 90 emu/g, achieves an Hc of 2,200 Oe or greater. As such, the present invention can be expected to contribute markedly to the field of high-density magnetic recording.

What is claimed is:

1. A magnetic powder for magnetic recording consisting essentially of iron-based acicular particles containing Co, Al, R (rare earth elements, including Y) and oxygen within the following ranges:
    Co/Fe=10–50 at. %
    dissolved Al/(Fe+Co)=5–50 at. %
    R/(Fe+Co)=2–25 at. %, and
    oxygen=not greater than 25 at. %;
    and wherein the acicular particles have
        an average major axis length of 25–80 nm,
        a saturated magnetization σs of 10–130 emu/g; and
        a coercive force Hc of 1940–2800 Oe.

2. A magnetic powder according to claim 1, wherein the coercive force Hc is not less than 2,100 Oe.

3. A magnetic powder for magnetic recording compatible with an MR head, consisting essentially of iron-based acicular particles containing Co, Al, R (rare earth elements, including Y) and oxygen within the following ranges:
    Co/Fe=10–50at. %,
    dissolved Al/(Fe+Co)=5–50 at. %,
    R/(Fe+Co)=2–25 at. %, and
    oxygen=not greater than 25 wt %;
    and wherein the acicular particles have
        an average major axis length of 25–80 nm, and
        a saturated magnetization σs of 10–129 emu/g.
        a coercive force Hc of 1940–2800 Oe, and
        a crystal grain diameter Dx of not greater than 145 angstroms.

4. A magnetic powder for magnetic recording compatible with an MR head, consisting essentially of iron-based acicular particles containing Co, Al, R (rare earth elements, including Y) and oxygen within the following ranges:
    Co/Fe=10–50at. %,
    dissolved Al/(Fe+Co)=5–50 at. %,
    R/(Fe+Co)=2–25 at. %, and
    oxygen=not greater than 25 wt %;
    and wherein the acicular particles have
        an average major axis length of 25–80 nm, and
        a saturated magnetization σs of 10–118 emu/g.
        a coercive force Hc of 1940–2800 Oe, and
        a crystal grain diameter Dx of not greater than 145 angstroms.

5. A magnetic powder for magnetic recording compatible with an MR head, consisting essentially of iron-based acicular particles containing Co, Al, R (rare earth elements, including Y) and oxygen within the following ranges:
    Co/Fe=10–50at. %,
    dissolved Al/(Fe+Co)=5–50 at. %,
    R/(Fe+Co)=2–25 at. %, and
    oxygen=not greater than 25 wt %;
    and wherein the acicular particles have
        an average major axis length of 25–80 nm, and
        a saturated magnetization σs of 10–110 emu/g.
        a coercive force Hc of 1940–2800 Oe, and
        a crystal grain diameter Dx of not greater than 145 angstroms.

6. A magnetic powder according to claim 4, wherein the coercive force Hc is not less than 2100 Oe.

7. A magnetic powder according to claim 5, wherein the coercive force Hc is not less than 2100 Oe.

* * * * *